US010131382B2

(12) United States Patent
Bach et al.

(10) Patent No.: US 10,131,382 B2
(45) Date of Patent: Nov. 20, 2018

(54) FRONT PILLAR FOR A VEHICLE BODY

(71) Applicant: Honda Motor Co., Ltd., Tokyo (JP)

(72) Inventors: Edward W. Bach, Galloway, OH (US);
Adam J. Rompage, Dublin, OH (US);
Hirokazu Matsuura, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 15/414,821

(22) Filed: Jan. 25, 2017

(65) Prior Publication Data

US 2017/0158245 A1   Jun. 8, 2017

Related U.S. Application Data

(62) Division of application No. 14/960,732, filed on Dec. 7, 2015, now Pat. No. 9,598,112.

(51) Int. Cl.
| | |
|---|---|
| *B60J 7/00* | (2006.01) |
| *B62D 25/04* | (2006.01) |
| *B62D 21/15* | (2006.01) |
| *B62D 29/00* | (2006.01) |

(52) U.S. Cl.
CPC .......... *B62D 25/04* (2013.01); *B62D 21/152* (2013.01); *B62D 29/008* (2013.01); *B60Y 2306/01* (2013.01)

(58) Field of Classification Search
CPC .... B01D 27/08; B01D 35/147; B01D 27/103; B01D 35/15; B61D 45/007
USPC ............. 296/193.06, 146.6, 187.05, 187.12, 296/193.05, 203.03; 1/1; 180/274
See application file for complete search history.

(56) References Cited

U.S. PATENT DOCUMENTS

| | | | | |
|---|---|---|---|---|
| 5,941,597 | A * | 8/1999 | Horiuchi ............... | B62D 25/04 296/193.06 |
| 6,293,617 | B1 | 9/2001 | Sukegawa | |
| 6,378,933 | B1 * | 4/2002 | Schoen ............... | B62D 29/002 296/187.02 |
| 6,474,726 | B1 * | 11/2002 | Hanakawa ........... | B62D 29/002 296/187.12 |
| 6,478,367 | B2 * | 11/2002 | Ishikawa ............... | B62D 25/04 296/199 |
| 6,550,847 | B2 * | 4/2003 | Honda ............... | B29C 44/1228 296/146.6 |
| 6,561,571 | B1 * | 5/2003 | Brennecke ........... | B62D 29/002 264/277 |

(Continued)

FOREIGN PATENT DOCUMENTS

| | | |
|---|---|---|
| JP | H06142754 | 5/1994 |
| JP | 2001191949 | 7/2001 |
| JP | 2006168594 | 6/2006 |

*Primary Examiner* — Kiran B Patel
(74) *Attorney, Agent, or Firm* — Rankin, Hill & Clark LLP

(57) ABSTRACT

A vehicle frame structure includes a front pillar having an internal space defined by a forward wall, a rear wall, an outer lateral side wall, and an inner lateral side wall. The internal space is partitioned by longitudinally extending first and second ribs connecting inside faces of the forward and rear walls and a laterally extending third rib connecting an inside face of the inner side wall and the first rib. The first, second and third ribs separate the front pillar into a plurality of interior hollow portions. Two laterally adjacent hollow portions define an outer lateral portion of the front pillar and two longitudinally adjacent hollow portions define an inner lateral portion of the front pillar.

9 Claims, 5 Drawing Sheets

(56) References Cited

U.S. PATENT DOCUMENTS

| | | | | |
|---|---|---|---|---|
| 6,607,239 B1* | 8/2003 | Fuji | ............... | B60R 22/24 296/203.03 |
| 6,698,823 B2* | 3/2004 | Kim | ............... | B62D 25/04 296/203.01 |
| 6,722,729 B2* | 4/2004 | Yoshida | ............... | B62D 25/04 296/187.09 |
| 6,854,790 B2* | 2/2005 | Yoshida | ............... | B62D 25/04 296/187.05 |
| 6,983,982 B2* | 1/2006 | Saeki | ............... | B62D 25/04 296/192 |
| 7,374,219 B2* | 5/2008 | Brennecke | ............... | B62D 29/002 296/187.02 |
| 7,506,911 B2* | 3/2009 | Lee | ............... | B62D 25/04 296/193.06 |
| 7,926,867 B2* | 4/2011 | Kochert | ............... | B62D 29/002 296/187.02 |
| 8,256,828 B2 | 9/2012 | Carle et al. | | |
| 8,414,068 B1 | 4/2013 | Na et al. | | |
| 8,530,015 B2* | 9/2013 | Mendiboure | ............... | B62D 29/002 296/187.02 |
| 8,690,227 B2* | 4/2014 | Matsuoka | ............... | B62D 21/155 296/187.09 |
| 8,857,896 B2* | 10/2014 | Pyun | ............... | B62D 25/04 296/187.09 |
| 8,899,670 B2* | 12/2014 | Kim | ............... | B62D 25/04 296/210 |
| 8,991,909 B2* | 3/2015 | Matsuda | ............... | B62D 25/02 296/187.12 |
| 9,227,666 B2* | 1/2016 | Yoshioka | ............... | B62D 25/025 |
| 9,302,710 B2* | 4/2016 | Bach | ............... | B62D 25/06 |
| 9,440,678 B2* | 9/2016 | Kurokawa | ............... | B62D 21/02 |
| 2001/0020797 A1* | 9/2001 | Saeki | ............... | B62D 21/15 296/203.03 |
| 2003/0102695 A1* | 6/2003 | Kim | ............... | B62D 25/04 296/203.03 |
| 2006/0138807 A1* | 6/2006 | Hasegawa | ............... | B62D 25/04 296/193.06 |
| 2007/0102964 A1* | 5/2007 | Yoshimoto | ............... | B60J 5/0425 296/187.12 |
| 2009/0026801 A1* | 1/2009 | Murayama | ............... | B60R 19/18 296/187.05 |
| 2010/0060037 A1* | 3/2010 | Terai | ............... | B60J 1/10 296/193.06 |
| 2010/0295336 A1* | 11/2010 | Itakura | ............... | B62D 25/02 296/193.06 |
| 2012/0161475 A1* | 6/2012 | Mori | ............... | B62D 21/157 296/193.06 |
| 2013/0257098 A1* | 10/2013 | Matsuda | ............... | B62D 25/00 296/187.12 |
| 2014/0084630 A1* | 3/2014 | Kojima | ............... | B62D 25/04 296/193.06 |
| 2015/0001884 A1 | 1/2015 | Saje et al. | | |
| 2015/0042126 A1* | 2/2015 | Matsuda | ............... | B62D 25/02 296/187.12 |

* cited by examiner

FRONT PILLAR FOR A VEHICLE BODY

BACKGROUND

A front pillar of a vehicle body is a critical structural member for front crash modes. On conventional steel white bodies the front pillar is formed of an inner panel and an outer panel that are welded together. Stiffeners, bulkheads, and/or reinforcements are added inside of the front pillar to improve its strength. A front weld flange of the front pillar typically connects to a dashboard lower. A rear weld flange of the front pillar can function as a door seal flange. High strength steel is generally used for strength. In aluminum vehicle frames the front pillar can be made of a stamped aluminum construction that is similar to the typical steel construction. An aluminum extrusion can also be used, and in some instances part of the front pillar can be cast aluminum.

BRIEF DESCRIPTION

According to one aspect, a vehicle frame structure comprises a front pillar having an internal space defined by a forward wall, a rear wall, an outer lateral side wall, and an inner lateral side wall. The internal space is partitioned by a longitudinally extending first rib and a laterally extending second rib interconnecting the first rib and the inner side wall. The first rib separates the front pillar into an outer lateral portion and an inner lateral portion. The outer lateral portion is defined by an outer lateral section of each of the front and rear walls and the outer side wall. The inner lateral portion is defined by an inner lateral section of each of the front and rear walls and the inner side wall. The inner lateral portion of the front pillar has a length greater than a length of the outer lateral portion of the front pillar.

According to another aspect, a vehicle frame structure comprises a front pillar having an internal space defined by a forward wall, a rear wall, an outer lateral side wall, and an inner lateral side wall. The internal space is partitioned by longitudinally extending first and second ribs connecting inside faces of the forward and rear walls and a laterally extending third rib connecting an inside face of the inner side wall and the first rib. The first, second and third ribs separate the front pillar into a plurality of interior hollow portions. Two laterally adjacent hollow portions define an outer lateral portion of the front pillar and two longitudinally adjacent hollow portions define an inner lateral portion of the front pillar.

According to another aspect, a vehicle frame structure comprises a front pillar having an internal space defined by a forward wall, a rear wall, an outer lateral side wall, and an inner lateral side wall. The internal space is partitioned by longitudinally extending first and second ribs connecting inside faces of the forward and rear walls and a laterally extending third rib connecting an inside face of the inner side wall and the first rib. The first, second and third ribs separate the front pillar into a plurality of interior hollow portions. One of the hollow portions solely defines an outer lateral portion of the front pillar and the remaining hollow portions define an inner lateral portion of the front pillar. Two of the remaining hollow portions at least partially defined by the forward wall are dimensioned smaller than two of the remaining hollow portions at least partially defined by the rear wall. The two smaller dimensioned hollow portions are configured as energy absorbing lobes of the inner lateral portion.

DETAILED DESCRIPTION

It should, of course, be understood that the description and drawings herein are merely illustrative and that various modifications and changes can be made in the structures disclosed without departing from the present disclosure. In general, the figures of the exemplary vehicle body are not to scale. As used herein, lateral directions are transverse across the vehicle body, i.e., left and right directions. Likewise, longitudinal directions refer to forward and rearward directions of vehicle travel, and the vertical directions relate to elevation, i.e., upward and downward directions. It will also be appreciated that the various identified components of the exemplary front pillar disclosed herein are merely terms of art that may vary from one manufacturer to another and should not be deemed to limit the present disclosure.

Figure 1:
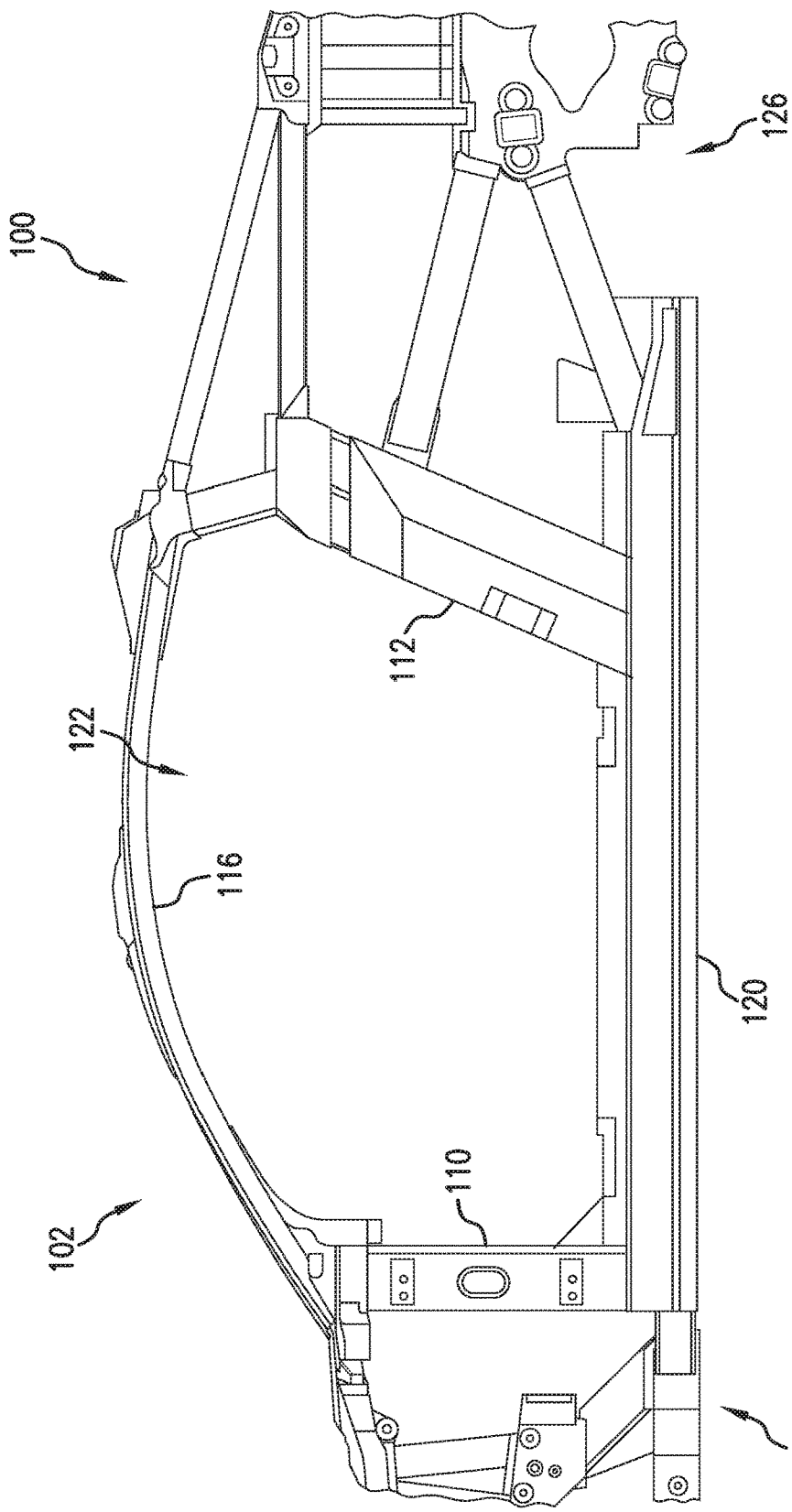
FIG. 1 is a schematic side view of a frame portion of a vehicle body according to the present disclosure.

Referring now to the drawings, wherein like numerals refer to like parts throughout the several views, FIG. 1 schematically illustrates a frame portion of a vehicle body 100 including a side frame structure 102 having a front pillar 110, a center pillar 112 each extending generally in the vertical direction, a longitudinally extending roof side rail 116 located above the pillars 110, 112, and a longitudinally extending side sill 120 located below the pillars 110, 112. These structural elements 110 to 120 define an openings 122 adapted to accommodate a door (not shown). The side frame structure 102 is provided at each of the right and left sides of the vehicle body 100 and may be identically constructed, but for their disposition on opposite sides of the vehicle. Incidentally, the structural elements 110 to 120 of the exemplary side frame structure 102 are constituted by aluminum or aluminum alloy members which are formed by extrusion molding so as the have the necessary sectional shapes respectively, as described below. The vehicle body 100 further includes a front frame structure 124 and a rear frame structure 126 each connected to the side frame structure 102, and a floor panel (not shown) is interposed between the left and right side sills. The features of the front frame structure 124 and rear frame structure 126 are not germane to the present disclosure and will be omitted for conciseness.

Figure 2:
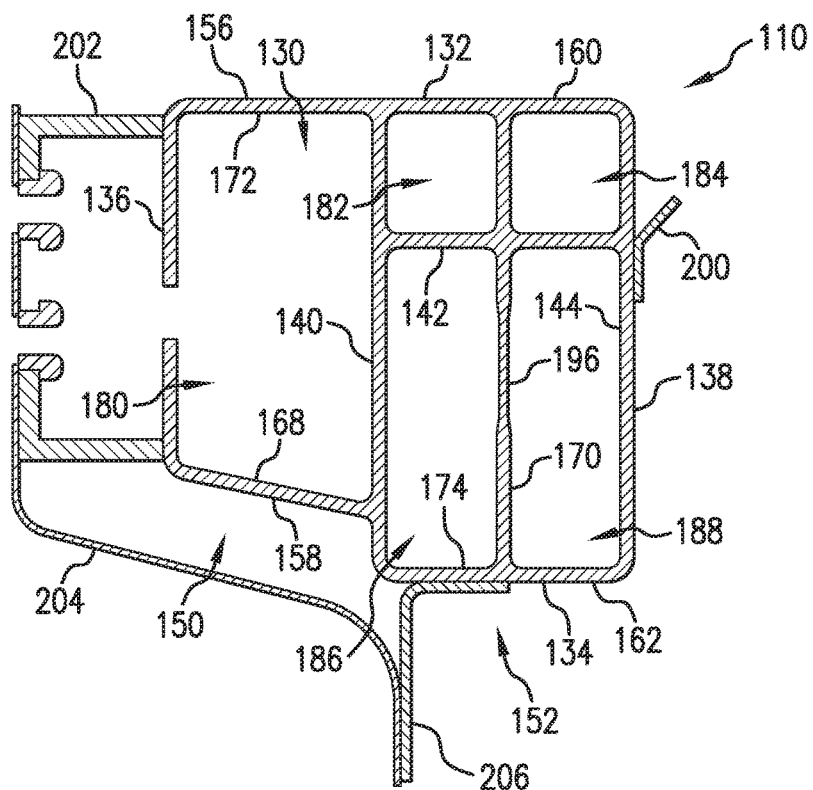
FIG. 2 is a cross-sectional view of a front pillar of the vehicle body of FIG. 1 according to one aspect of the present disclosure.

FIG. 2 is a cross-sectional view of the exemplary front pillar 110 of the vehicle body 100 according to one aspect of the present disclosure. The front pillar 110 has an internal space 130 defined by a forward wall 132, a rear wall 134, an outer lateral side wall 136, and an inner lateral side wall 138. The side walls 136, 138 are located on, respectively, the left and right sides as viewed in the drawing, i.e., the outer and inner sides with respect to the vehicle body 100. In this sense, the side walls 136, 138 are referred to as the outer lateral side wall and the inner lateral side wall, respectively. The internal space 130 is partitioned by a longitudinally extending first rib 140 and a laterally extending second rib 142. As depicted, the second rib 142 connects the first rib 140 and an inside face 144 of the inner side wall 138. The first rib 140 separates the front pillar 110 into an outer lateral portion 150 and an inner lateral portion 152. Accordingly, the outer lateral portion 150 of the front pillar 110 is defined by an outer lateral section 156 of the front wall 132, an outer lateral section 158 of the rear wall 134, and the outer side wall 136. The inner lateral portion 152 of the front pillar 110 is defined by an inner lateral section 160 of the forward wall 132, an inner lateral section 162 of the rear wall 134, and the inner side wall 138. As shown, the inner lateral portion 152 of the exemplary front pillar 110 has a length greater than a length of the outer lateral portion 150 of the front pillar 110. Further, the outer lateral section 158 of the rear wall 134 includes an angled wall portion 168 extending in a vertical direction and connecting the outer side wall 136 and the first rib 140.

The inner lateral portion 152 of the front pillar 110 is further defined by a longitudinally extending third rib 170 extending parallel to the first rib 140. The third rib 170 intersects the second rib 142 and connects respective inside faces 172, 174 of the forward and rear walls 132, 134. The first rib 140, second rib 142, and third rib 170 separate the exemplary front pillar 110 into a plurality of interior hollow portions, and more particularly into five interior hollow portions 180 to 188. The outer lateral portion 150 of the front pillar 110 solely defines the hollow portion 180. The inner lateral portion 152 of the front pillar 110 defines the remaining hollow portions 182 to 188. The hollow portions 182, 184, which are defined by a forward portion of the inner side wall 138, the first rib 140, the second rib 142 and the inner lateral section 160 of the forward wall 132 are dimensioned smaller than the hollow portions 186, 188, which are defined by a rear portion of the inner side wall 138, the first and second ribs 140, 142 and the inner lateral section 162 of the rear wall 134. As will be described below, the two smaller dimension hollow portions 182, 184 are configured as energy absorbing lobes of the inner lateral portion 152 of the front pillar 110. The third rib 170 includes a section 196 rearward of the second rib 142 having a variable thickness. The section at least partially separates the hollow portions 186, 188 and is adapted to control a crush distance of the two smaller dimension hollow portions 182, 184 and transfer load to the rear wall 134. As depicted, the section 196 of the third rib 170 has a reduced thickness.

Figure 3:
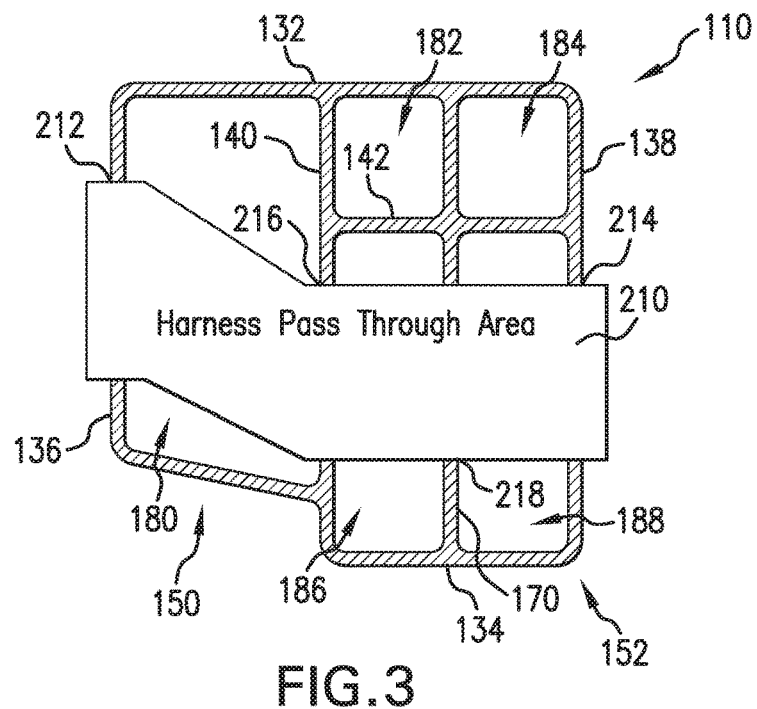
FIG. 3 is another cross-sectional view of the front pillar of FIG. 2 showing a harness pass through area.

With continued referenced to FIG. 2, the inner side wall 138 of the front pillar 110 defines a mounting surface for a dashboard lower panel 200 which can be positioned rearward of the second rib 142. A hinge plate 202 is secured to the outer side wall 136 and defines a mounting surface for an outer side panel 204. The rear wall 134 defines a mounting location for a door support flange 206 which is secured to the outer side panel 204. This allows a door seal (not shown) to be attached to a non-structural separate part of the vehicle body 100. Further, FIG. 3 depicts a door harness pass through area 210 of the front pillar 110 which is defined by respective openings 212, 214 located in each of the outer and inner side walls 136, 138 and respective openings 216, 218 located in each of the first and third ribs 140, 170. With this arrangement, the harness pass through area 210 is rearward of the second rib 142 and is defined only through the hollow portions 186, 188 of the inner lateral portion 152 of the front pillar 110.

Figure 4:
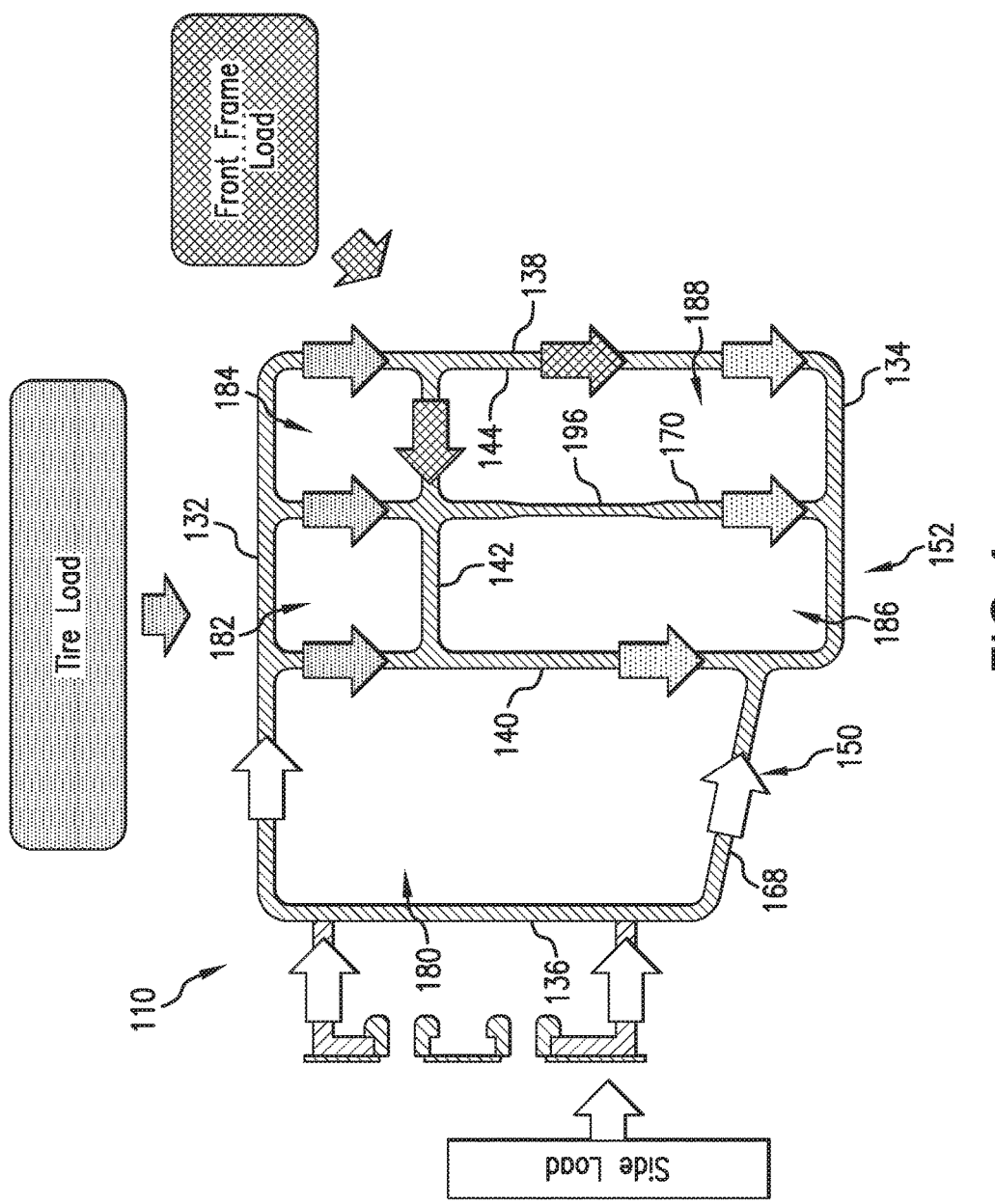
FIG. 4 depicts a force or load distribution of the front pillar of FIG. 2.

FIG. 4 illustrates a force or load distribution of the exemplary front pillar 110 as a result of a tire load (from impact of the forward wall 132 with a front tire), a separate front frame load and a separate side load (from a side crash impact). As depicted, because the forward wall 132 is located directly rearward of the front tire, the tire load is transferred from the forward wall 132 to the rear wall 134 via the first rib 140, third rib 170, and inner side wall 138. The tire load distributed to the rear wall 134 is then transferred to the surrounding body structure of the vehicle body 100. An increased tire load can cause the smaller hollow portions 182, 184 to crush during impact thereby absorbing energy. As indicated previously, the outer lateral portion 150 of the front pillar is dimensioned smaller than the inner lateral portion 152 which can minimize a moment arm caused by loading of the door hinge. The variable thickness of the section 196 of the third rib 170 controls the crush distance of the hollow portions 182, 184 and further transfers the load to the surrounding body structure. The front frame load path is aligned with the second rib 142. The front frame load is transferred through the second rib 142 to the first rib 140. The front frame load is further transferred through the inner side wall 138 and then to the surrounding body structure of the vehicle body 100. The side load applied to the outer side wall 136 is transferred through the forward wall 132 and the rear wall 134 to the surrounding body structure of the vehicle body 100.

Accordingly, the exemplary front pillar 110 comprises an aluminum extruded section with internal strengthening ribs 140, 142, 170 to manage input loads. The front pillar includes a plurality of interior hollow portions 180 to 188 defined by the internal ribs. The first and second ribs 140, 142 create the two smaller rectangular hollow portions 182, 184 in the front of the front pillar section. These hollow portions 182, 184 allow this area of the front pillar 110 to crush under the impact load of the front tire on the forward wall 132. This crush absorbs energy slowing the front tire down in a front crash mode. The third rib 170 includes the section 196 rearward of the second rib 142 having a variable thickness to control the crush distance of the hollow portions 182, 184. The variable thickness then transfers the remaining energy after crushing to the rear wall 134 of the front pillar 110 and then into the surrounding body. The first rib 140 stabilizes the crush of the outer lateral portion 150 from the tire load and transfers energy into the rear wall 134 of the extrusion. The door harness pass through area 210 is passed through the outer side wall 136 in a different location from the ribs 140, 170 and the inner side wall 138. The second rib 142 sets the door harness pass through area location for the inner side wall 138 and the ribs 140, 170. The front pillar 110 is adapted to manage the impact force of the front tire in a front crash mode and the load from the front frame and transfer this combined load into the surrounding body structure. The front pillar 110 is further adapted to manage the impact force of a side crash and transfer this side load into the surrounding body structure.

Figure 5:
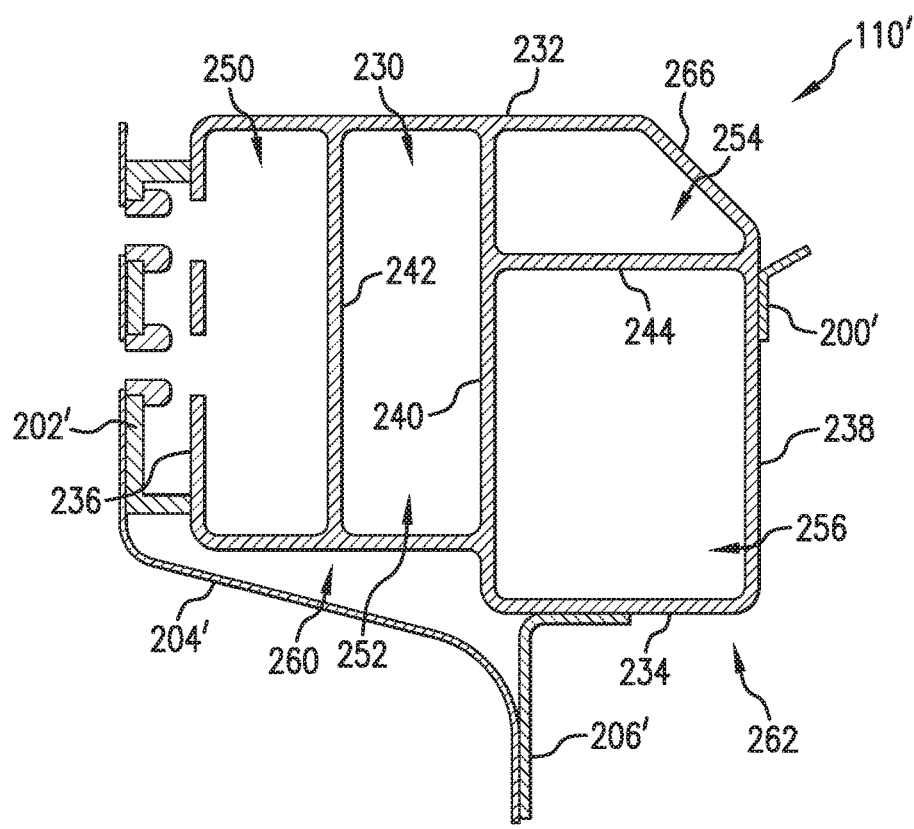
FIG. 5 is a cross-sectional view of a front pillar of the vehicle body of FIG. 1 according to another aspect of the present disclosure.

FIG. 5 is a cross-sectional view of an exemplary front pillar 110' of the vehicle body 100 according to another aspect of the present disclosure. The front pillar 110' has an internal space 230 defined by a forward wall 232, a rear wall 234, an outer lateral side wall 236, and an inner lateral side wall 238. The internal space 230 is partitioned by longitudinally extending first and second ribs 240, 242. The first and second ribs 240, 242 connect inside faces of the forward wall 232 and the rear wall 234. A laterally extending third rib 244 connects an inside face of the inner side wall 238 and the first rib 240. Similar to the front pillar 110, the first, second, and third ribs 240, 242, 244 separate the front pillar 110' into a plurality of interior hollow portions, and more particularly into four hollow portions 250 to 256. The two laterally adjacent hollow portions 250, 252 define an outer lateral portion 260 of the front pillar 110' and the two longitudinally adjacent hollow portions 254, 256 define an inner lateral portion 262 of the front pillar 110'. The inner lateral portion 262 of the front pillar 110' has a length greater than a length of the outer lateral portion 260. The front pillar 110' further includes an angled wall portion 266 extending in the vertical direction and connecting the forward wall 232 and the inner side wall 238. The angled wall portion 266 defines part of the inner lateral portion 262 of the front pillar 110' and the third rib 244 is located rearward of the connection of the angled wall portion 266 and the inner side wall 238. As will be described below, the angled wall portion 266, together with the forward wall 232, second rib 240 and third rib 244, defines the hollow portion 254 which is an energy absorbing load of the inner lateral portion 262 of the front pillar 110'.

Figure 6:
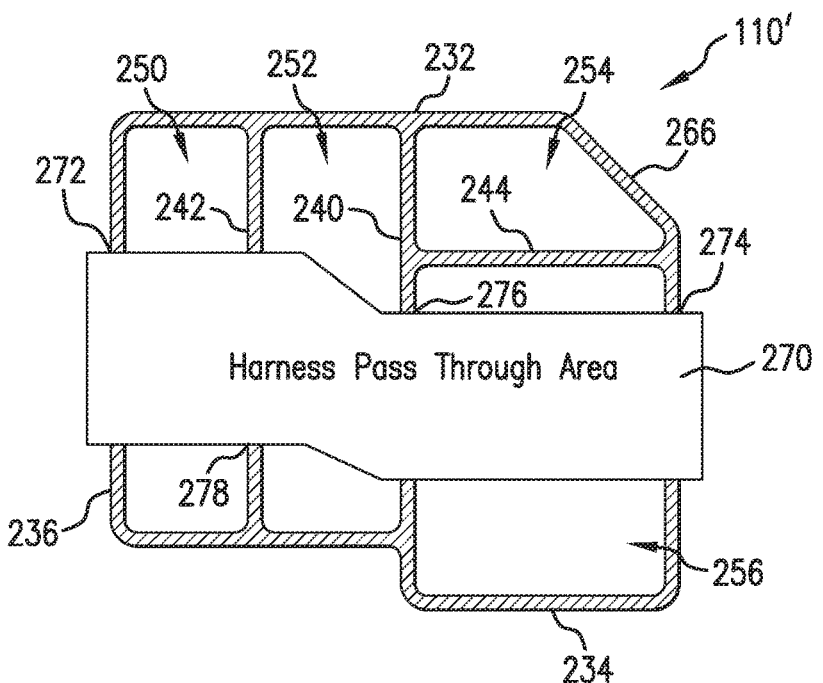
FIG. 6 is another cross-sectional view of the front pillar of FIG. 5 showing a harness pass through area.

The inner side wall 238 defines a mounting surface for a dashboard lower panel 200' which can be positioned rearward of the third rib 244. A hinge plate 202' is secured to the outer side wall 236 and defines a mounting surface for an outer side panel 204'. The rear wall 234 defines a mounting location for a door support flange 206' which is secured to the outer side panel. This allows a door seal (not shown) to be attached to a non-structural separate part of the vehicle body 100. Further, FIG. 6 depicts a door harness pass through area 270 of the front pillar 110'. The harness pass through area 270 is defined by respective openings 272, 274 located in each of the outer and inner side walls 236, 238 and respective openings 276, 278 in the first and second ribs 240, 242. The harness pass through area 270 is located rearward of the third rib 244.

Figure 7:
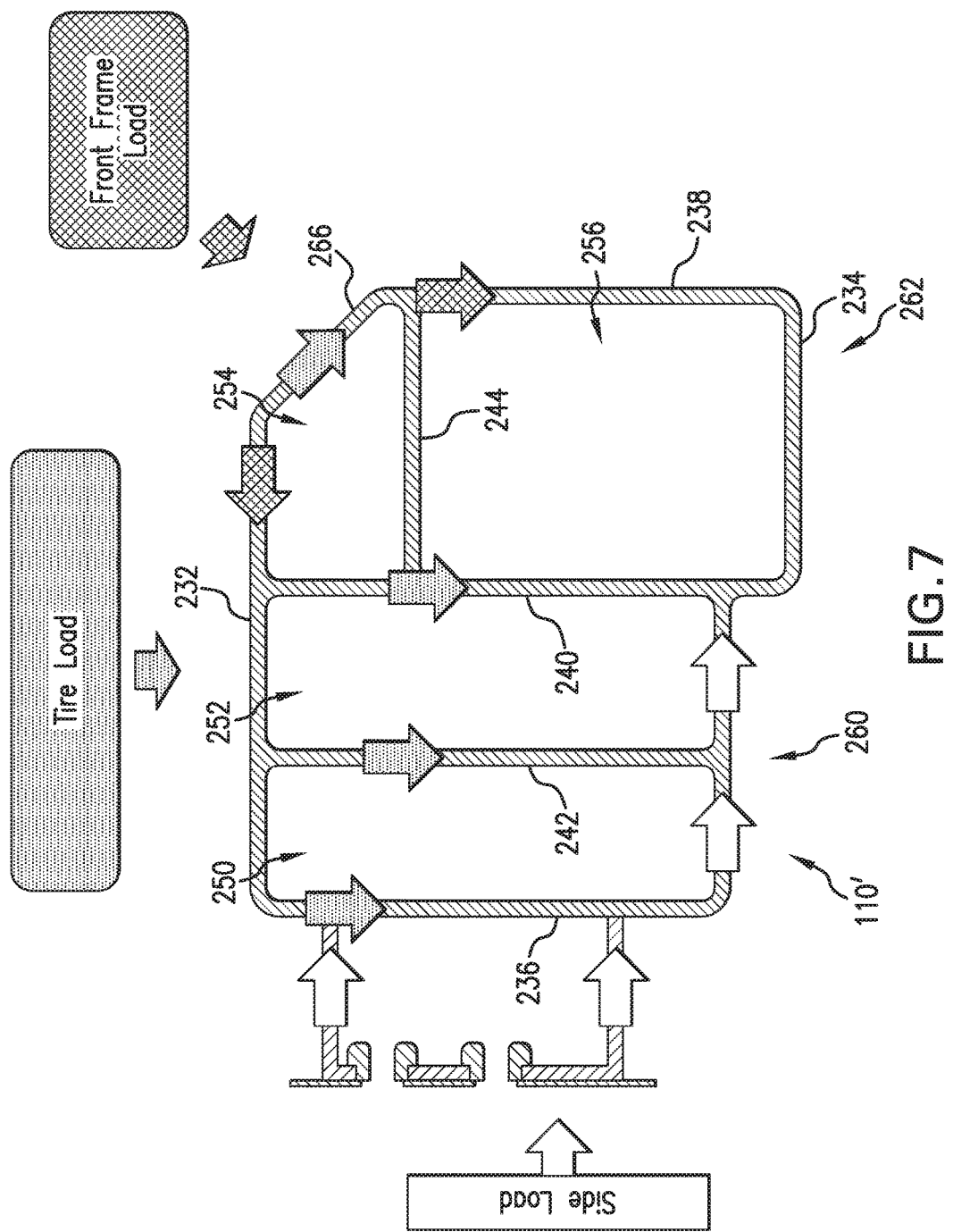
FIG. 7 depicts a force or load distribution of the front pillar of FIG. 5.

FIG. 7 illustrates a force or load distribution of the exemplary front pillar 110' as a result of a tire load (from impact of the forward wall 232 with a front tire), a separate front frame load and a separate side load. As depicted, because the forward wall 232 is located directly rearward of the front tire, the forward wall 232 distributes tire load into the outer side wall 236, the first rib 240, the second rib 242, and through the angled wall portion 266 into the inner side wall 238. The load is transferred to the rear wall 234 and into the surrounding body structure of the vehicle body 100. The second rib 242 takes the tire impact load and stabilizes the crush of the outer lateral portion 260 of the front pillar 110'. The second rib 242 further supports the outer lateral portion 260 for door hinge loading. It should be appreciated that at least one of the first rib 240 and second rib 242 can include a section having a variable thickness, which can be adapted to control a crush distance of the hollow portion 254 and transfer load to the rear wall 234. The angled wall portion 266 allows the front frame load to transfer through the forward wall 232 and the inner side wall 238. The third rib 244 stabilizes the crush of the hollow portion 254 and the load is transferred to the rear wall 234 and to the surrounding body structure of the vehicle body. The side load applied to the outer side wall 236 is transferred through the rear wall 234 and the front wall 232 to the surrounding body structure of the vehicle body 100.

Accordingly, the exemplary front pillar 110' comprises an aluminum extruded section with internal strengthening ribs 240, 242, 244 to manage input loads. The front pillar includes a plurality of interior hollow portions 250 to 256 defined by the internal ribs. The rear wall 234 of the front pillar transfers load into the surrounding body. The angled wall portion 266 is adapted to allow load transferred from the front frame to be directed down the forward wall 232 and inner side wall 238 distributing the force. The third rib 244 stabilizes the crush of the hollow portion 254 at least partially defined by the angled wall portion 266. The impact load of the front tire is transferred through the outer side wall 236, the first and second ribs 240, 242 and the angled wall portion 266. The first rib 240 separates the outer and inner lateral portions 260, 262 of the front pillar 110'. The second rib 242 stabilizes the outer lateral portion 260 of the front pillar 110' under the front tire loading and door hinge loading. A door harness can be passed through the outer side wall 236 and the second rib 242 in the same location. Due to the third rib position for performance the door harness passes through the inner side wall 238 and the first rib 240 in the same location, and this location differs from the outside location. The exemplary front pillar 110' applies the angled wall portion 266 to transfer load from the front frame to the rest of the front pillar section. The first and second ribs 240, 242 transfer load from the front tire impact to the rest of the front pillar section and the surrounding body. The front pillar 110' is further adapted to manage the impact force of a side crash and transfer this side load into the surrounding body structure. And the internal ribs 240, 242, 244 still allow for the routing of the door harness through the front pillar section.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame structure comprising:
a front pillar having an internal space defined by a forward wall, a rear wall, an outer lateral side wall, and an inner lateral side wall, the internal space partitioned by a longitudinally extending first rib and a laterally extending second rib interconnecting the first rib and the inner side wall, the first rib separating the front pillar into an outer lateral portion and an inner lateral portion, the outer lateral portion defined by an outer lateral section of each of the front and rear walls and the outer side wall, the inner lateral portion defined by an inner lateral section of each of the front and rear walls and the inner side wall, the inner lateral portion of the front pillar having a length greater than a length of the outer lateral portion of the front pillar.

2. The frame structure of claim 1, wherein the outer lateral portion of the front pillar is further defined by a longitudinally extending third rib connecting inside faces of the forward and rear walls, and the front pillar includes an angled wall portion extending in a vertical direction and connecting the forward wall and the inner side wall.

3. The frame structure of claim 2, wherein the angled wall portion defines part of the inner lateral portion of the front pillar, and the second rib is located rearward of the connection of the angled wall portion and the inner side wall, the angled wall portion together with the first and second ribs at least partially defining an energy absorbing lobe of the inner lateral portion.

4. The frame structure of claim 3, wherein the angled wall portion is adapted to transfer load from an associated front frame to the forward wall and inner side wall, the second rib adapted to stabilize crushing of the angled wall portion, and the first and third ribs are adapted to transfer a load from an associated front tire to the rear wall.

5. The frame structure of claim 2, wherein a harness pass through area is defined by openings located in each of the outer and inner side walls and the first and third ribs, the harness pass though area being rearward of the second rib.

6. The frame structure of claim 1, wherein a hinge plate is secured to the outer side wall and defines a mounting surface for an associated outer side panel, the rear wall defines a mounting location for an associated door support flange which is secured to the associated outer side panel, and the inner side wall define a mounting surface for an associated dashboard lower panel which is positioned rearward of the second rib.

7. The frame structure of claim 1, wherein the inner lateral portion of the front pillar is further defined by a longitudinally extending third rib intersecting the second rib and connecting inside faces of the forward and rear walls, the second and third ribs at least partially defining energy absorbing lobes of the inner lateral portion.

8. The frame structure of claim 7, wherein the third rib includes a section rearward of the second rib having a reduced thickness.

9. The frame structure of claim 7, wherein a harness pass through area is defined by openings located in each of the outer and inner side walls and the first and third ribs, the harness pass though area being rearward of the second rib.

* * * * *